United States Patent Office 3,008,959
Patented Nov. 14, 1961

3,008,959
16-ALKOXYLATED STEROID COMPOUNDS AND PROCESS
Rudolph G. Berg, New London, Gerald D. Laubach, Niantic, and Donald P. Cameron, New London, Conn., assignors to Chas. Pfizer & Co., Inc., New York, N.Y., a corporation of Delaware
No Drawing. Filed June 24, 1959, Ser. No. 822,450
5 Claims. (Cl. 260—239.55)

The present invention relates to steroid compounds and is more particularly concerned with 16-alkoxylated corticosteroids and 21-esters thereof, to novel intermediates in the production thereof and a process for the production of the novel compounds and the novel intermediate thereof.

Prior to this invention, 16-alkoxylated steroids, and methods for the preparation thereof have been reported. However, the methods utilized for the preparation of such functionally modified 16-hydroxy-substituted steroids are of limited utility.

It has now been found that a 16-alkoxy group can be easily introduced into the 16-position of the steroid molecule to give 16-alkoxylated steroids which possess the complete corticosteroid side chain. The essential feature of the process of this invention resides in protecting the corticosteroid side chain of, for example, a 16β-bromo or a 16β-chloro corticosteroid by conversion to the bismethylenedioxy derivative. The thus protected compound is then reacted with a suitable silver salt to give the corresponding 16-alkoxylated corticosteroid-bismethylenedioxy derivative from which the bismethylenedioxy function can easily be removed.

Compounds of the character described in the present application possess valuable anti-inflammatory, anti-rheumatoid arthritic and glucocorticoid activities to a remarkable degree. The 16-alkoxylated corticosteroids of this invention have been found to possess these valuable therapeutic activities to a pronounced degree.

These compounds are also useful in the treatment of inflammatory conditions of the skin, ears, and eyes of humans and of valuable domestic animals as well as contact dermatitis and other allergic reactions. Compositions containing the valuable compounds of the present invention can be prepared for administration to humans or animals in conventional dosage forms such as, pills, tablets, capsules, solutions, elixirs or syrups for oral use, or in liquid forms which are adaptable to the natural and synthetic cortical steroid hormones for injectable products. The novel steroids can also be administered topically in the form of ointments, creams, and the like.

The novel compounds of the present invention can be illustrated by the formulae:

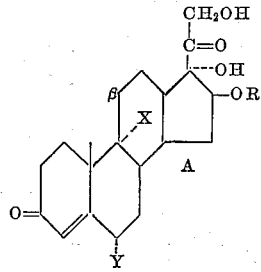

A

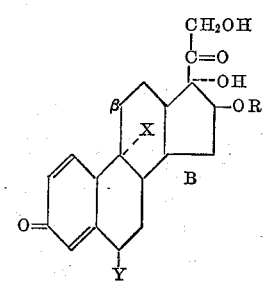

B

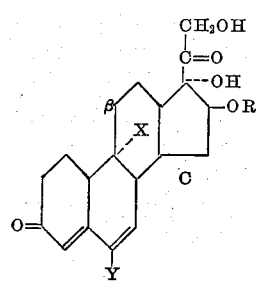

C

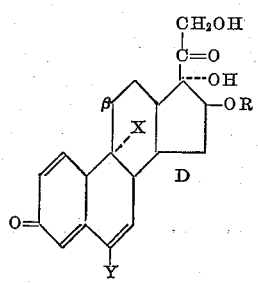

D wherein X is hydrogen, and fluorine; B is keto, β-hydroxy methylene; Y is hydrogen, fluoro, chloro, and methyl; R is selected from the group consisting of alkyl and alkenyl radicals containing up to 18 carbon atoms, and aralkyl; and the 21-acylates thereof wherein the acyl radical is that of a hydrocarbon carboxylic acid containing from one to eight carbon atoms, inclusive.

The novel process of the present invention for introducing a 16-alkoxy group into the steroid nucleus can be indicated in general by the following reaction sequence utilizing 17,20;20,21-bismethylenedioxy-16β-bromo-Δ⁴-pregnene-3-one as model compound:

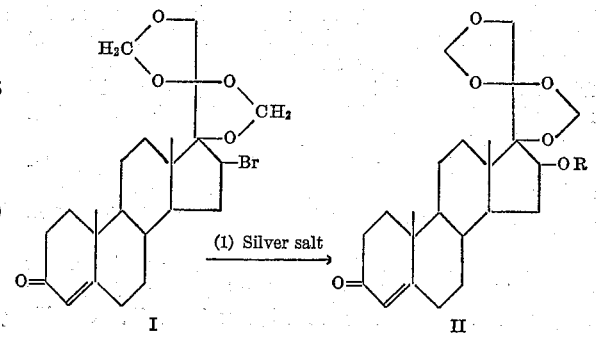

I        II

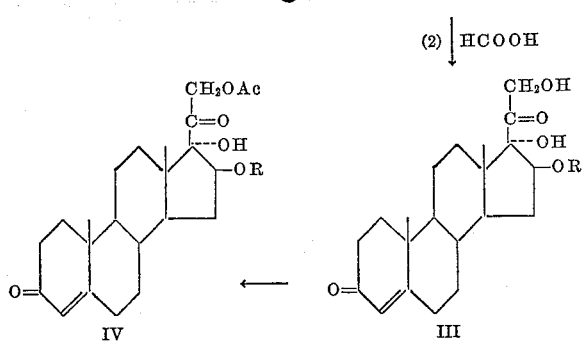

wherein R has the same significance as above, and Ac is an acyl radical of an organic carboxylic acid, preferably a hydrocarbon carboxylic acid containing from one to eight carbon atoms inclusive.

The process of the present invention is practiced in general by reaction of a 16β-halo-17,20;20,21-bismethylenedioxy derivative with a silver salt, such as, for example, silver alkoxide, silver perchlorate, silver fluoride, silver benzoate, silver oxide, silver nitrate, silver acetate, silver p-toluene sulfonate, silver salicylate, silver sulfinate, silver lactate, in the presence of the appropriate alcohol to produce the bismethylenedioxy derivative of the 16-alkoxy-17α,21-dihydroxy-3,20-dione (II). Reversal of the protective bismethylenedioxy function in acid media yields the 16-alkoxylated steroid (III) possessing the complete corticosteroid side chain.

The simple or basic 16-alkoxylated corticosteroid derivatives of this invention; 17,20;20,21-bismethylenedioxy-16-alkoxy-Δ⁴-pregnene-3-one, (Formula II), 17,20;20,21-bismethylenedioxy-16-alkoxy-Δ⁴,⁹⁽¹¹⁾-pregnadiene - 3 - one and 17,20;20,21-bismethylenedioxy-16-alkoxy - Δ⁴ - pregnene-3-one-11α, acetate, produced according to the above sequence, serve as suitable starting materials for the preparation of compounds of this invention corresponding to Formulae A, B, C and D above. For example, halogen substituents are introduced using the well known route of Fried and Sabo set forth in the J. Am. Chem. Soc. 79, 1130 (1957). The compounds 1-dehydro-9α-fluorohydrocortisone, 6-dehydro-9α-fluorohydrocortisone, and 1-dehydro-9α-fluorocortisone are prepared by the method of Fried et al., the J. Am. Chem. Soc. 77, 4181 (1955). Oxidation with chromium trioxide in acetic acid gives the corresponding 11-keto compounds. A variety of 6α-methyl compounds can be prepared by the method of Spero et al., as described in the J. Am. Chem. Soc. 78, 6213 (1956) and 79, 1515 (1957). These include, for example, 6α-methyl-hydrocortisone acetate, 6α-methyl-prednisolone acetate, 6α-methyl-9α-fluoro-hydrocortisone and 6α-methyl-9α-fluoro-prednisolone, all of which can be oxidized to the corresponding 11-keto compounds with N-bromoacetamide in pyridine. Meystre et al., in Helvetica Chimica Acta, 39, 734, describe a method for introducing double bonds at the 1-position of Δ⁴-3-keto-steroids or the 1- and 4-positions of A-ring saturated 3-ketosteroids using selenium dioxide. Shull, Kita and Davisson in U.S. Patent 2,658,023 describe a microbiological method using an organism of the genus Curvularia whereby a β-hydroxyl group may be introduced at the 11-position of a variety of steroids. A double bond at the 6-position of many steroid compounds can be obtained with chloranil in refluxing n-amyl alcohol by the method of Agnello and Laubach set forth in the J. Am. Chem. Soc. 79, 1257 (1957).

A recently issued series of United States Patents describes the preparation of a large number of 6-fluoro steroid compounds. These include not only basic hydrocortisone, cortisone, desoxycorticosterone, and corticosterone compounds with halogen at the 6-position, but also a wide variety of compounds with other substituents on the molecule such as 2-methyl and 9-halo. Specific patents from this series which describe the preparation of such compounds are:

2,838,498
2,838,541
2,737,549
2,838,540

More specifically, the compounds of this invention are prepared by processes analogous to those described in our copending patent application Serial Nos. 801,000; 801,001; 801,002; 801,003; 801,004, filed March 23, 1959, concerning 16-fluoro-corticosteroids. The preparation of compounds of this invention wherein X and Y are hydrogen is accomplished by subjecting 17,20;20,21-bismethylenedioxy-16β-bromo-Δ⁴-pregnene-3-one to the reaction sequence illustrated above to give 16-alkoxy-11-desoxyhydrocortisone (III) which is then microbiologically hydroxylated using a species of the genus Curvularia as set forth by Shull et al., in U.S. Patent 2,658,023. The 16-alkoxyhydrocortisone produced is then acylated and dehydrogenated by means of about 1–1.5 moles selenium dioxide per mole of 16-alkoxylhydrocortisone in an inert solvent such as t-amyl alcohol or t-butanol in the presence of a lower aliphatic acid such as acetic or propionic acid. The 16-alkoxy-prednisolone acylate is isolated by filtration of the reaction mixture, followed by evaporation of the filtrate in vacuo and crystallization from a suitable organic solvent or by chromatography on various adsorbents.

Oxidation of 16-alkoxy-hydrocortisone 21-acylate and of 16-alkoxy1prednisolone 21-acylate with, for example, chromium trioxide in acetic acid produces 16-alkoxy-cortisone and 16-alkoxy prednisone. The 9α-fluoro-16-alkoxylated corticosteroids are prepared from 17,20;20,21 - bismethylenedioxy - 16β - bromo-Δ⁴,⁹⁽¹¹⁾-pregnadiene-3-one, itself prepared as described in our copending patent application Serial Number 801,004, filed March 23, 1959. The said 16β-bromo-bismethylenedioxy compound is then reacted with a suitable silver salt, such as silver fluoride and silver perchlorate in the appropriate alcohol to produce the corresponding 16-alkoxy-Δ⁴,⁹⁽¹¹⁾-pregnadiene-17α,21-diol-3,20-dione-bismethylenedioxy derivative. The 16-alkoxy derivative is then reacted with a hypohalogenating agent to produce the corresponding 9α-halo-11β-hydroxy halohydrin which is then converted to the corresponding 9β,11β-epoxide. The thus produced 9β,11β-oxido - 16 - alkoxy-Δ⁴-pregnene-17α,21-diol-3,20-dione-bis-methylenedioxy derivative is then treated with a fluorinating agent to produce the corresponding 9α-fluoro-16-alkoxy-hydrocortisone bismethylenedioxy derivative. Removal of the bismethylenedioxy function produces the corresponding alcohol which can then be acylated and oxidized to the corresponding 9α-fluoro-16-alkoxy-cortisone. Dehydrogenation of the thus produced hydrocortisone and cortisone derivatives produces the corresponding 1,2-dehydro derivatives.

The 6α-halo substituted-16-alkoxylated corticosteroids of this invention are prepared using 17,20;20,21-bismethylenedioxy-16β-bromo-Δ⁴-pregnene - 3 - one - 11α - acetate as starting material. This is prepared from 16α,17α-oxido-desoxycorticosterone by the process described in our copending patent application, Serial Number 801,002, filed March 23, 1959. The 17,20;20,21-bismethylenedioxy-16β-bromo-Δ⁴-pregnene-3-one-11-acetate is treated with a silver salt of the type mentioned above in the presence of an alcohol corresponding to the R group desired to produce the corresponding 17,20;20,21-bismethylenedioxy-16-alkoxy-Δ⁴-pregnene-3-one-11α-acetate; ketalizing the said 3-keto-16-alkoxyl compound to the corresponding 3-ketal-Δ⁵-pregnene derivative; epoxidizing the thus produced 3-ketalized-Δ⁵-pregnene to the corresponding 3,20-diketo-5α,6α-oxide-11α,17α,21-trihydroxy-16-alkoxy-allopregnane-3-ethylene ketal 11-acetate, bismethylenedioxy derivative; halogenating the said oxide with an agent selected from the group consisting of chlorinating and fluorinating agents to produce the corresponding halohydrin; hydrolyzing the said 3-ketalized-halohydrin to the corresponding 3-keto-11-hydroxy-halohydrin; oxidizing the said 3-keto-11-hydroxy-halohydrin to the corresponding 3,11,20 - triketo-5α,17α,21-trihydroxy-6β-halo-16-alkoxyl-allopregnane bismethylenedioxy derivative; dehydrating the thus produced allopregnane compound to produce the corresponding bismethylenedioxy derivative of 6β-halo-16-alkoxy-cortisone; ketalizing said bismethylenedioxy compound to the corresponding bismethylenedioxy derivative of 6β - halo - 16 - alkoxy-Δ⁵-pregnene-3-ethylene ketal; reducing the thus produced Δ⁵-pregnene derivative to the corresponding bismethylenedioxy derivative of 6β-halo-16-alkoxy-Δ⁵-pregnene-11β-ol-3-ethylene ketal; hydrolyzing said ketal derivative to the corresponding bismethylenedioxy derivative of 6β-halo-16-alkoxy-hydrocortisone; removing the bismethylenedioxy function of the thus produced hydrocortisone compound to give 6β-halo-16-alkoxy-hydrocortisone; acylating the said hydrocortisone compound to produce 6β-halo-16-alkoxy-hydrocortisone 21-acylate: isomerizing the thus obtained 6β-halo-16-alkoxy-hydrocortisone 21-acylate to the corresponding 6α-halo-16-alkoxy-hydrocortisone 21-acylate; oxidizing the said hydrocortisone derivative to give 6α-halo-16-alkoxy-cortisone 21-acylate; hydrolyzing said 6α-halo-16-alkoxy-hydrocortisone 21-acylate and said 6α-halo-16-alkoxy-cortisone 21-acylate compounds to the corresponding 21-alcohols; dehydrogenating said 21-acylates to produce 6α-halo-16-alkoxy-prednisolone and 6α-halo-16-alkoxy-prednisone; dehydrating 6α-halo-16-alkoxy-hydrocortisone 21-acylate to produce 6α-halo-16-alkoxy-Δ⁴,⁹⁽¹¹⁾-pregnadiene-17α,21-diol-3,20-dione 21-acylate; reacting said pregnadiene compound with a hypohalogenating agent to produce 6α-halo-9α-bromo-16-alkoxy-hydrocortisone 21-acylate; converting the thus produced halohydrin to the corresponding 6α-halo-9β,11β-oxido-16-alkoxy-hydrocortisone 21-acylate; cleaving said 9β,11β-oxido compound with a fluorinating agent to give 6α-halo-9α-fluoro-16-alkoxy-hydrocortisone 21-acylate; oxidizing said hydrocortisone compound to the corresponding 6α-halo-9α-fluoro-16-alkoxy-cortisone 21-acylate; dehydrogenating said 6α-halo-9α-fluoro-16-alkoxy-Δ⁴-pregnenes to the corresponding Δ¹-dehydro analogs; hydrolyzing the thus obtained corticosteroid acylates to the corresponding 21-alcohols.

The 6-methyl group is introduced into the 16-alkoxyl-ated corticosteroid in the manner described in our co-pending patent application relating to 6α-methyl-16-fluoro-corticosteroids, Serial No. 801,000, filed March 23, 1959, which comprises: treating the above mentioned bismethylenedioxy derivative of 3,20-diketo-5α,6α-oxido-11α,17α,21-trihydroxy-16-alkoxy-allopregnane 3-ethylene ketal 11-acylate with methyl magnesium bromide to produce the 5α-hydroxy-6β-methyl derivative, and then subjecting the said 6β-methyl compound to the reaction sequence described above for the 6-halo-16-alkoxy-corticosteroids.

It should be pointed out that the appropriate 16β-chloro-bismethylenedioxy derivatives are also operable in the process of this invention. However, the 16β-bromo-bismethylenedioxy derivatives are generally preferred since, relative to the corresponding 16β-chloro compounds, they can be prepared in better yields and undergo the solvolysis reaction with subsequent ether formation more readily.

The etherification or solvolysis reaction is conveniently effected by reacting the appropriate 16β-bromo or 16β-chloro-bismethylenedioxy derivative with silver perchlorate or silver fluoride under anhydrous conditions. Although a great variety of silver salts, such as, those previously mentioned, are operative, silver perchlorate and silver fluoride are favored since they produce substantially better yields of the desired 16-alkoxy compounds.

The remaining silver salts generally produce the corresponding alkyl ester, such as, alkyl acetate or nitrate, along with the ether in substantial quantity. In using silver perchlorate, the preferred agent, it is desirable to also employ a neutralizing agent to react with and effectively remove the perchloric acid produced. As neutralizing agents, silver oxide and silver carbonate have been found satisfactory since they not only neutralize the perchloric acid produced but, as a result of the neutralization reaction, produce more silver perchlorate. Therefore, by employing the silver perchlorate-silver oxide or silver carbonate-silver perchlorate system for etherification, a quantity of silver perchlorate less than that which would be required when using some other neutralizing agent can be used. The hazards attendant with the use of perchlorates in general are thus reduced.

Anhydrous conditions are necessary in order to prevent formation of the 16-hydroxy compounds. When using the silver perchlorate-silver oxide (or silver carbonate) system, the water formed by the neutralization reaction does not interfere to any appreciable extent with formation of the desired ether. The relatively small amount of 16-hydroxy compound produced is easily separated, for example, by virtue of solubility differences, from the 16-alkoxy compound. In order to obtain maximum yield of the desired 16-alkoxy compound with minimum amount of by-product formation, the water produced by the neutralization should be removed. This desideratum is accomplished by adding an organic liquid, such as, toluene or benzene, to the reaction mixture to permit continuous removal of the by-product water by azeotropic distillation. In actual practice it has been found convenient to dry the silver perchlorate by azeotropic distillation with benzene or toluene and to add the dry solution of silver perchlorate thus produced to the alcoholic solution of the 16β-bromo compound.

From a theoretical standpoint, the mole ratio of neutralizing agent: silver perchlorate: 16β-bromo compound should be 1:2:2. From a practical standpoint, however, the use of a mole ratio of reactants of from about 1:2:2 to about 2:12:1 is satisfactory. The mole ratio of silver perchlorate to 16β-bromo compound is advantageously held below a 12:1 ratio in the interest of economics. In actual practice the use of at least from about 2 moles up to about 12 moles of silver perchlorate per mole of 16β-bromo compound gives a satisfactory rate of reaction and is desirable for this reason. The use of a mole ratio of neutralizing agent to 16β-bromo compound of 1 to 2, the stoichiometric requirement, while operative, leads to a slow rate of neutralization. In order to obtain optimum yields and relatively short reaction periods, a mole ratio of neutralizing agent to 16β-bromo compound of from about 1:1 to about 2:1 has been found to produce consistently high yields with reaction periods of generally less than about 3 hours. The higher mole ratios of neutralizing agent to other reactants ensure rapid neutralization of the perchloric acid produced and a relatively rapid rate of reaction. The mole ratio of neutralizing agent: silver perchlorate: 16β-bromo compound should therefore range from about 1:2:2 to 2:12:1.

Conditions similar to those described for the silver perchlorate system also apply when using silver fluoride as solvolyzing reagent. It has been noted that the 16-fluoro compound is simultaneously produced necessitating the separation of a more complex mixture than that obtained when using silver perchlorate. The tendency toward displacement of the bromo atom by the fluoro atom or conversely, the tendency toward solvolysis varies greatly with the alcohol used. Maximum solvolysis occurs with methanol and tends to decrease with increasing molecular weight of the alcohol used.

Silver oxide or silver carbonate also function as efficient neutralizing agents with silver fluoride. As a rule, silver fluoride produces lower yields than does silver perchlorate and, for this reason, silver perchlorate is the preferred solvolyzing agent.

The amount of alcohol used is not a critical factor but can vary from about 1 mole of alcohol per mole of 16β-bromo compound upwards to any desired amount. In actual practice a large excess of alcohol is used since it not only serves as reactant but also as solvent. As alcohols suitable for this reaction, primary and secondary alcohols, saturated and unsaturated, containing up to 18 carbon atoms in the carbon chain are operative. In addition, aralkyl alcohols such as, benzyl alcohol, β-phenethyl alcohol, and cinnamyl alcohol can be used. Substituted aliphatic alcohols such as, ethylene glycol, propylene glycol and butylene glycol can also be used.

The reaction is preferably conducted in an inert atmosphere and should be protected from light in order to prevent photochemical decomposition of the silver salts used. In the preferred embodiment of this invention, the appropriate 16β-bromo-bismethylenedioxy compound is treated with silver perchlorate:silver oxide or silver perchlorate:silver carbonate under anhydrous conditions in the absence of light in an excess of the alcohol corresponding to the alkoxy group desired. A mole ratio of neutralizing agent:silver perchlorate:16β-bromo compound of about 1:2:1 to about 1:12:1 should be used. The reaction is conducted at the reflux temperature of the alcohol used. In the case of high molecular weight and, hence, of high boiling alcohols, the temperature should be held below the decomposition temperture of the reactants and products. The reaction is complete within about 2 hours to about 8 hours depending on the alcohol used.

It will be understood by those skilled in the art that the specific order of steps can be inverted or transposed or otherwise varied to suit the purposes of economics and convenience.

For example, in the preparation of the 6α,9α-dihalo-16-alkoxycorticosteroids of this invention, the 16α-halo group can, if desired, be introduced into the appropriate 9α-halo-16-alkoxycorticosteroid by well known reactions. To illustrate, a 9α-fluoro-16-alkoxy cortisone 21-acetate can be ketalized to the corresponding 3-ketal-Δ⁵-pregnene, epoxidized to the 5α,6α-oxide then converted to the corresponding 3-ketalized 5α-hydroxy-6β-halo derivative. The said 3-ketalized 5α-hydroxy-6β-halo compound is then hydrolyzed to the corresponding 3-keto halohydrin, then dehydrated to the 6β,9α-dihalo-16-alkoxy cortisone compound, "then isomerized to the corresponding 6α,9α-dihalo difluoro compound."

The following examples are illustrative of the products and process of this invention and are not to be construed as limiting.

EXAMPLE I

*17,20;20,21-bismethylenedioxy-16-methoxy-$\Delta^4$-pregnene-3-one*

Ten grams of 17,20;20,21-bismethylenedioxy-16β-bromo-$\Delta^4$-pregnene-3-one (1.0 mol) (16β-bromo BMD), prepared as described in the copending patent application of Berg and Laubach, Serial No. 801,003, filed March 23, 1959, in 300 ml. of anhydrous methyl alcohol at reflux under an atmosphere of nitrogen was treated with 10 gms. of dry silver oxide (2.0 mole) and 4.30 gms. of silver perchlorate (1.0 mole). The anhydrous methyl alcohol was dried by distillation from aluminum isopropoxide and the silver perchlorate dried by azeotropic distillation with toluene. After 2 hours at reflux, the insoluble matter was removed by filtration, water added to the filtrate and the mixture distilled under reduced pressure to remove the alcohol and then extracted with methylene chloride. The methylene chloride solution was washed with water to remove the silver salt then dried, evaporated and the residue crystallized from methyl alcohol. The product melted at 189 to 190° C.; $(\alpha)^{25°}$ (3% dioxane=+6.46).

*Analysis.*—Calculated for $C_{24}H_{34}O_6$: 68.87% carbon, 8.19% hydrogen. Found: 68.84% carbon, 8.11% hydrogen.

In like manner, the following 17,20;20,21-bismethylenedioxy-16-alkoxy-$\Delta^4$-pregnene-3-one compounds are prepared. A maximum reaction temperature of 200° C. is used. 16-n-butoxy, isobutoxy, hexoxy, n-octoxy, decoxy, tetradecoxy, octadecoxy, allyloxy, crotoxy, cinnamoxy, 2-hydroethoxy, cis-9-decenoxy, and benzyloxy. Additionally, the same compounds are prepared by substitution of 16β-chloro BMD for 16β-bromo BMD.

EXAMPLE II

On repeating the procedure of Example I, but using ethyl alcohol and isopropyl alcohol in place of methyl alcohol, the respective 17,20;20,21-bismethylenedioxy-16-ethoxy and 16-isopropoxy-$\Delta^4$-pregnene-3-one compounds were obtained.

| R | M.P.,° C. | $(\alpha)^{25°}$ 3% (dioxane) | Formula | Percent carbon | | Percent hydrogen | |
|---|---|---|---|---|---|---|---|
| | | | | Calcd. | Fd. | Calcd. | Fd. |
| $C_2H_5$— | 194–198 | +2.9 | $C_{25}H_{36}O_6$ | 69.42 | 69.44 | 8.39 | 8.46 |
| i-$C_3H_7$— | 151–154 | | $C_{26}H_{38}O_6$ | 69.93 | 69.67 | 8.58 | 8.70 |

Following the procedure of Example I but using mole ratios of neutralizing agent:silver perchlorate:16β-bromo-bismethylenedioxy compound as indicated in the table below, the respective 16-methoxy, ethoxy and isopropoxy compounds were obtained.

| Neutralizing agent | | Moles $AgClO_4$ | Moles 16Br-BMD | Time (hrs.) |
|---|---|---|---|---|
| Compound | Moles | | | |
| $Ag_2O$ | 1 | 2.25 | 1 | 2 |
| $Ag_2O$ | 1 | 11.23 | 1 | 2 |
| $Ag_2O$ | 2 | 11.23 | 1 | 2.5 |
| $Ag_2O$ | 1 | 22.00 | 1 | 2 |
| $Ag_2O$ | 1 | 4.53 | 1 | 12 |
| $Ag_2O$* | 2 | 0.75 | 1 | 8 |
| $Ag_2O$ | 1 | 0.75 | 1 | 8 |
| $Ag_2CO_3$ | 1 | 4.53 | 1 | 12 |
| $Ag_2CO_3$ | 1 | 11.23 | 1 | 2 |
| $Ag_2CO_3$ | 1 | 2 | 2 | 5 |
| $Ag_2CO_3$ | 2 | 2 | 1 | 8 |

*Toluene was added to the reaction mixture and the water removed by continuous azeotropic distillation.

EXAMPLE III

*17,20;20,21-bismethylenedioxy-16-alkoxy-$\Delta^4$-pregnene-3-ones*

The procedure of Example I was repeated using the appropriate alcohol with silver fluoride in place of silver perchlorate with and without a neutralizing agent. The mole ratio of neutralizing agent:silver fluoride:17,20;20,21-bismethylenedioxy - 16β-bromo-$\Delta^4$-pregnene-3-one, the alcohol used and the products obtained are listed below. Where indicated, the 16β-chloro-derivative was substituted for the 16β-bromo compound.

| Neutralizing agent | Silver salt | 16β-halo-compound | Alcohol | Mole Ratio | 16β-alkoxy-compound |
|---|---|---|---|---|---|
| | AgF | Bromo | Methyl | 0:1:1 | Methoxy. |
| | AgF | Chloro | do | 0:1:1 | Do. |
| $Ag_2O$ | AgF | Bromo | do | 1:1:1 | Do. |
| | AgF | do | Ethyl | 0:2:1 | Ethoxy. |
| | AgF | Chloro | do | 0:4:1 | Do. |
| $Ag_2CO_3$ | AgF | Bromo | Isopropyl | 2:1:1 | Isopropoxy. |

EXAMPLE IV

*16-methoxy-$\Delta^4$-pregnene-17α,21-diol-3,20-dione (16-methoxy-11-desoxy-hydrocortisone)*

Five grams of 17,20;20,21-bismethylenedioxy-16-methoxy-$\Delta^4$-pregnene-3-one was refluxed for 12 minutes in 60% formic acid (300 ml.). The solution was then cooled to 30° C. immediately by the addition of ice and then extracted several times with methylene chloride. The combined organic layers were extracted twice with water, dried over anhydrous magnesium sulfate, filtered and concentrated under reduced pressure. The oil residue thus obtained was treated with 50 ml. of methanol containing 0.5 gm. concentrated sulphuric acid at room temperature for 25 minutes to hydrolyze the small amounts of 21-formate ester formed during the above reaction. A small amount of solvent was distilled during this hydrolysis to remove methyl formate and displace the equilibrium. The resulting mixture was treated with 200 ml. of water and extracted with several portions of methylene chloride. The combined organic layers were washed with several portions of water, dried over anhydrous magnesium sulphate, filtered and concentrated in vacuo. The last traces of methanol were displaced by adding and distilling off several small portions of benzene. The product was then dissolved in a minimum amount of refluxing benzene, filtered and concentrated to incipient crystallization at atmospheric pressure and then cooled to complete crystallization. In like manner, the corresponding 16-ethoxy and isopropoxy compounds were hydrolyzed to the respective 21-alcohols.

| R | M.P., °C. | $(\alpha)^{25°}$ 3% (dioxane) | Formula | Percent Carbon | | Percent Hydrogen | |
|---|---|---|---|---|---|---|---|
| | | | | Calcd. | Fd. | Calcd. | Fd. |
| $CH_3$ | 148-149 | +111.5 | $C_{22}H_{31}O_6$ | 70.18 | 70.14 | 8.57 | 8.46 |
| $C_2H_5$ | 171-174 | +105.0 | $C_{23}H_{33}O_6$ | 70.74 | 70.61 | 8.78 | 8.96 |

On repeating the procedure above, the 17,20;20,21-bis-methylenedioxy-16-alkoxy-$\Delta^4$-pregnene-3-one products of Example I are hydrolyzed to the respective 21-alcohols in which the group at the 16-position is n-butoxy, isobutoxy, hexoxy, n-octoxy, decoxy, tetradecoxy, octadecoxy, allyloxy, crotoxy, cis-9-octadecenoxy, cinnamoxy, 2-hydroxyethoxy and benzyloxy.

EXAMPLE V

*16-methoxy-$\Delta^4$-pregnene-11$\beta$,17$\alpha$,21-triol-3,20-dione (16-methoxy hydrocortisone)*

11$\beta$-hydroxylation of the products of Example IV in accordance with United States Patent 2,658,023 produces the following 16-alkoxy-hydrocortisone derivatives:

16-methoxy-$\Delta^4$-pregnene-11$\beta$,17$\alpha$-21-triol-3,20-dione
16-ethoxy-$\Delta^4$-pregnene-11$\beta$,17$\alpha$,21-triol-3,20-dione
16-isopropoxy-$\Delta^4$-pregnene-11$\beta$,17$\alpha$,21-triol-3,20-dione
16-n-butoxy-$\Delta^4$-pregnene-11$\beta$,17$\alpha$,21-triol-3,20-dione
16-isobutoxy-$\Delta^4$-pregnene-11$\beta$,17$\alpha$,21-triol-3,20-dione
16-hexoxy-$\Delta^4$-pregnene-11$\beta$,17$\alpha$,21-triol-3,20-dione
16-n-octoxy-$\Delta^4$-pregnene-11$\beta$,17$\alpha$,21-triol-3,20-dione
16-decoxy-$\Delta^4$-pregnene-11$\beta$,17$\alpha$,21-triol-3,20-dione
16-tetradecoxy-$\Delta^4$-pregnene-11$\beta$,17$\alpha$,21-triol-3,20-dione
16-octadecoxy-$\Delta^4$-pregnene-11$\beta$,17$\alpha$,21-triol-3,20-dione
16-allyloxy-$\Delta^4$-pregnene-11$\beta$,17$\alpha$,21-triol-3,20-dione
16-crotoxy-$\Delta^4$-pregnene-11$\beta$,17$\alpha$,21-triol-3,20-dione
16-cinnamoxy-$\Delta^4$-pregnene-11$\beta$,17$\alpha$,21-triol-3,20-dione
16-benzyloxy-$\Delta^4$-pregnene-11$\beta$,17$\alpha$,21-triol-3,20-dione
16-(2-hydroxyethoxy) - $\Delta^4$ - pregnene - 11$\beta$,17$\alpha$,21 - triol-3,20-dione
16-cis-9-octadecenoxy - $\Delta^4$ - pregnene - 11$\beta$,17$\alpha$,21 - triol-3,20-dione Acetylation according to conventional methods gives the corresponding 16-alkoxy-hydrocortisone 21-acetates.

EXAMPLE VI

*16-methoxy-$\Delta^{1,4}$-pregnadiene-11$\beta$,17$\alpha$,21-triol-3,20-dione*

A mixture of 0.5 gm. of 16-methoxy-hydrocortisone 21-acetate, freshly sublimed selenium dioxide (0.5 gm.) and 10 ml. of dibutyl Cellosolve are heated under a nitrogen atmosphere for about 10 hours at 175° C. The brown supernatant solution is decanted from the solid and cooled to room temperature. The addition of low boiling petroleum ether precipitates impure 16-methoxy-prednisolone 21-acetate. Chromatographic separation on a Florisil (synthetic magnesium silicate) column gives, on elution with methylene chloride-ethanol, the pure product.

Hydrolysis of the 21-acetate with concentrated hydrochloric acid in chloroform, methanol and water (1:4:11:1 by volume) according to known procedures yields the corresponding 21-alcohol.

In like manner the following compounds are prepared using the appropriate alcohol:

16-ethoxy-$\Delta^{1,4}$-pregnadiene-11$\beta$,17$\alpha$,21-triol-3,20-dione
16-isopropoxy-$\Delta^{1,4}$-pregnadiene-11$\beta$,17$\alpha$,21-triol-3,20-dione
16-n-butoxy-$\Delta^{1,4}$-pregnadiene-11$\beta$,17$\alpha$,21-triol-3,20-dione
16-isobutoxy-$\Delta^{1,4}$-pregnadiene-11$\beta$,17$\alpha$,21-triol-3,20-dione
16-hexoxy-$\Delta^{1,4}$-pregnadiene-11$\beta$,17$\alpha$,21-triol-3,20-dione
16-n-octoxy-$\Delta^{1,4}$-pregnadiene-11$\beta$,17$\alpha$,21-triol-3,20-dione
16-decoxy-$\Delta^{1,4}$-pregnadiene-11$\beta$,17$\alpha$,21-triol-3,20-dione
16-tetradecoxy-$\Delta^{1,4}$-pregnadiene-11$\beta$,17$\alpha$,21-triol-3,20-dione
16-octadecoxy-$\Delta^{1,4}$-pregnadiene-11$\beta$,17$\alpha$,21-triol-3,20-dione
16-allyloxy-$\Delta^{1,4}$-pregnadiene-11$\beta$,17$\alpha$,21-triol-3,20-dione
16-crotoxy-$\Delta^{1,4}$-pregnadiene-11$\beta$,17$\alpha$,21-triol-3,20-dione
16-cinnamoxy-$\Delta^{1,4}$-pregnadiene-11$\beta$,17$\alpha$,21-triol-3,20-dione
16-benzyloxy-$\Delta^{1,4}$-pregnadiene-11$\beta$,17$\alpha$,21-triol-3,20-dione
16-2-hydroxyethoxy-$\Delta^{1,4}$-pregnadiene-11$\beta$,17$\alpha$,21-triol-3,20-dione
16-cis-9-octadecenoxy-$\Delta^{1,4}$-pregnadiene-11$\beta$,17$\alpha$,21-triol-3,20-dione

EXAMPLE VII

*16-methoxy-$\Delta^4$-pregnene-17$\alpha$,21-diol-3,11,20-trione (16-methoxy-cortisone)*

16-methoxy-hydrocortisone 21-acetate (0.5 g.) is oxidized in glacial acetic acid (12 ml.) with chromium trioxide (0.2 g.) in 50% aqueous acetic acid at about 12° C. to 15° C. for approximately 30 minutes. The mixture is then poured into water (100 ml.), neutralized with sodium bicarbonate to give 16-methoxy-cortisone 21-acetate. Hydrolysis of the 21-acetate according to the procedure of Example VI gives 16-methoxy-cortisone.

Oxidation of the remaining products of Example V in the same manner produces the corresponding 16-alkoxy cortisones: 16-ethoxy, isopropoxy, n-butoxy, hexoxy, n-octoxy, decoxy, tetradecoxy, octadecoxy, allyloxy, crotoxy, cinnamoxy, benzyloxy (2-hydroxyethoxy), and cis-9-octadecenoxy-cortisone.

EXAMPLE VIII

*16-methoxy-$\Delta^{1,4}$-pregnadiene-17$\alpha$,21-diol-3,11,20-trione (16-methoxy-prednisone)*

Following the procedure of Example VI, 16-methoxy-cortisone 21-acetate is converted to 16-methoxy-prednisone. The product thus obtained is identical to the product prepared by oxidation of 16-methoxy-prednisolone according to the procedure of Example VII.

Following the procedure of Example VI, 16-methoxy-$\Delta^4$-pregnene-17$\alpha$,21-diol-3,11,20-trione is converted to 16-methoxy-prednisone.

Similarly, the remaining 16-alkoxy cortisone derivatives of Example VII are converted to the corresponding 16-alkoxy prednisones: 16-ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy and cis-9-octadecenoxy.

EXAMPLE IX

*17,20;20,21-bismethylenedioxy-16-methoxy-$\Delta^{4,9(11)}$-pregnadiene-3-one*

17,20;20,21-bismethylenedioxy - 16$\beta$ - bromo - $\Delta^{4,9(11)}$-pregnadiene-3-one, prepared as described in the copending patent application of Berg and Laubach, Serial Number 801,004, filed March 23, 1959, is reacted with silver oxide-silver perchlorate according to the procedure of Example I to give 17,20;20,21-bismethylenedioxy-16-methoxy-$\Delta^{4,9(11)}$-pregnadiene-3-one.

Substitution of the corresponding 16β-chloro-derivative for the 16β-bromo derivative produces the same product.

In like manner, but using the appropriate alcohol, the following 17,20:20,21-bismethylenedioxy - 16 - alkoxy-$\Delta^{4,9(11)}$-pregnadiene-3-ones are prepared from both the 16β-bromo- and 16β-chloro compounds: 16-ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy and cis-9-octadecenoxy.

EXAMPLE X

17,20;20,21-bismethylenedioxy-9α-bromo-16-methoxy-$\Delta^4$-pregnene-11β-ol-3-one Solid N-bromoacetamide (0.96 g.) is added dropwise with stirring to a suspension of 16-methoxy-$\Delta^{4,9(11)}$-pregnadiene-17α,21-diol-3,20-dione bismethylenedioxy derivative (2 g.) and 0.46 N perchloric acid (3 ml.) in peroxide-free dioxane (80 ml.) at room temperature over a period of about one hour. The reaction is protected from light during the addition and for an additional hour. A 10% aqueous sodium sulfite is added with stirring until KI-starch paper no longer turns blue. Ice (50 g.) and chloroform (200 ml.) is added and the layers separated. The chloroform-dioxane solution is washed with water, then concentrated to a syrup in vacuo at room temperature. The addition of acetone (175 ml.) to the syrup causes rapid crystallization. The mixture is chilled overnight, then filtered. Additional product is recovered from the filtrate by evaporation to dryness. Recrystallization from isopropyl ether gives pure bismethylenedioxy derivative of 9α - bromo - 16-methoxy-$\Delta^4$-pregnene-11β,17α,21-triol-3,20-dione. Substitution of hydrogen chloride, hydrogen iodide or hydrogen fluoride for hydrogen bromide according to the procedure described by Fried et al., J. Am. Chem. Soc. 79, 1130 (1957), gives the corresponding 9α-chloro, iodo and fluoro derivatives.

Substitution of the appropriate 16-alkoxy compound for the 16-methoxy compound in the above procedure produces the corresponding 17,20;20,21-bismethylenedioxy-9α-bromo-16-alkoxy-$\Delta^4$-pregnene-11β-ol-3-ones; 16-ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy and cis-9-octadecenoxy.

EXAMPLE XI

17,20;20,21-bismethylenedioxy-9β,11β-oxido-16-methoxy-$\Delta^4$-pregnene-3-one A solution of the product of Example X (2 g.) in dioxane is added to a solution of anhydrous potassium acetate (1.4 g.) in absolute alcohol (15 ml.) heated to near reflux temperature. The mixture is heated to reflux for about 45 minutes and then cooled rapidly. The product, the bismethylenedioxy derivative of 9β,11β-oxido-16-methoxy-$\Delta^4$-pregnene-17α,21-diol-3,20-dione is precipitated by the addition of ice-water and filtered. Concentration of the filtrate permits isolation of additional product. The same product is obtained when the corresponding 9α-chloro or 9α-fluoro derivative is employed as starting material.

In like manner, the following 16-alkoxy homologs and analogs are prepared from the appropriate 17,20;20,21-bismethylenedioxy - 9α - bromo- 16 -alkoxy-$\Delta^4$-pregnene-11β-ol-3-ones: 16-ethoxy, isopropoxy, butoxy, isobutoxy, hexoxy, n-octoxy, decoxy, tetradecoxy, octadecoxy allyloxy, crotoxy, cinnamoxy, benzyloxy, hydroxyethoxy and cis-9-ocetadecenoxy.

EXAMPLE XII

17,20;20,21-bismethylenedioxy-9α-fluoro-16-alkoxy-$\Delta^4$-pregnene-11β-ol-3-one Approximately 1.2 g. of anhydrous hydrogen fluoride is passed into a solution of the appropriate bismethylenedioxy derivative of 9β,11β-oxido-16-alkoxy-$\Delta^4$-pregnene-17α,21-diol-3,20-dione (1 g.) in redistilled chloroform (20 ml.) contained in a polyethylene bottle at 0° C. The mixture becomes an intense red color and separates into two layers. After 1-5 hours at 0° C., the mixture is made weakly alkaline by the addition of sodium bicarbonate solution. The chloroform layer is separated and evaporated to dryness to give the crude 9α-fluoro-16-alkoxy derivative. The products are recrystallized from ethyl acetate.

In this manner the following 17,20;20,21-bismethylenedioxy-9α-fluoro-16-alkoxy-$\Delta^4$-pregnene-11β-ol-3 - ones are prepared: 16-methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy and cis-9-octadecenoxy.

EXAMPLE XIII

9α-fluoro-16-alkoxy-$\Delta^4$-pregnene-11β,17α,21-triol-3,20-dione

Hydrolysis of the products of Example XII with 60% formic acid according to the procedure of Example IV produces the corresponding 9α-fluoro-16-alkoxy-$\Delta^4$-pregnene-11β,17α,21-triol-3,20-diones: 16-methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, cis-9-octadecenoxy.

EXAMPLE XIV

9α-fluoro-16-alkoxy-$\Delta^4$-pregnene-17α,21-diol-3,11,20-trione

Oxidation of the products of Example XIII according to the procedure of Example VII produces the corresponding 9α-fluoro-16-alkoxy-$\Delta^4$-pregnane-17α,21-diol - 3,11,20-triones: 16-methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, cis-9-octadecenoxy.

EXAMPLE XV

9α-fluoro-16-alkoxy-$\Delta^{1,4}$-pregnadiene-11β,17α,21-triol-3,20-dione

Dehydrogenation of the products of Example XIII with selenium dioxide as described in Example VI produces the corresponding 9α-fluoro-16-alkoxy-$\Delta^{1,4}$-pregnadiene-11β,17α,21-triol-3,20-diones wherein the 16-alkoxy group is: methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy and cis-9-octadecenoxy.

Similarly, dehydrogenation of the products of Example XIV produces the corresponding 9α-fluoro-16-alkoxy-$\Delta^{1,4}$-pregnadiene-17α,21-diol-3,11,20-triones wherein the 16-alkoxy group is: methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy and cis-9-octadecenoxy.

EXAMPLE XVI

17,20;20,21-bismethylenedioxy-16-methoxy-$\Delta^4$-pregnene-11α-ol-3-one-11-acetate 17,20;20,21 - bismethylenedioxy - 16β - bromo - $\Delta^4$-pregnene-11α-ol-3-one-11-acetate, prepared as described in the copending patent application of Berg and Laubach, Serial No. 801,002, filed March 23, 1959, is reacted with silver oxide-silver perchlorate and methyl alcohol according to the procedure of Example I to give the corresponding 16-methoxy compound.

Substitution of methyl alcohol by appropriate alcohols produces the corresponding 17,20;20,21-bismethylenedioxy-16-alkoxy-Δ⁴-pregnene-11α-ol-3-one-11-acetates wherein the 16-alkoxy group is ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy and cis-9-octadecenoxy.

Utilization of silver fluoride as reactant for the solvolysis of 17,20;20,21-bismethylenedioxy-16-bromo-Δ⁴-pregnene-11α-ol-3-one-11-acetate by isopropyl, n-octyl, allyl and benzyl alcohols produces the corresponding 16-isopropoxy, n-octoxy, allyloxy and benzoxy derivatives. Additionally, the same compounds are obtained by utilization of the corresponding 16β-chloro compound in place of the 16β-bromo compound.

EXAMPLE XVII

*17,20;20,21-bismethylenedioxy-16-alkoxy-Δ⁵-pregnene-11α-ol-3-one-3-ethyleneketal-11-acetate*

The products of Example XVI (5 g.) are thoroughly mixed with benzene (75 ml.) and ethylene glycol (2 ml.) and heated to remove the small amount of water present by azeotropic distillation. Paratoluenesulfonic acid monohydrate 0.2 g. is added and the mixture stirred and refluxed for 20 hours with continuous removal of water. The mixture is then cooled, made basic by the addition of 5% aqueous sodium carbonate, and extracted with a 1:1 solution of benzene and ether. The organic layer is separated, dried over anhydrous magnesium sulfate, filtered and evaporated under reduced pressure to give the respective 17,20;20,21-bismethylenedioxy-16-alkoxy-Δ⁵-pregnene-11α-ol-3-one-3-ethyleneketal-11-acetate derivatives: 16-methoxy-, ethoxy, isopropoxy, n-butoxy, hexoxy, n-octoxy, decoxy, tetradecoxy, octadecoxy, allyloxy, crotoxy, cinnamoxy, i-butoxy, benzyloxy, 2-hydroxyethoxy and cis-9-octadecenoxy.

EXAMPLE XVIII

*17,20;20,21-bismethylenedioxy-3-keto-5α,6α-oxido-11α-hydroxy-16-alkoxy-allopregnane-3-ethylene ketal 11-acetate*

To a solution of the products of Example XVII (5 g.) in chloroform (100 ml.) is added a chilled solution of perbenzoic acid (2 g.) dissolved in chloroform (35 ml.). After 24 hours at about 5° C. followed by 72 hours at room temperature, the solution is washed with 5% aqueous sodium bicarbonate and then with water. The chloroform layer is separated, dried and evaporated to give the crude epoxide. Recrystallization from methanol gives pure product.

In this manner, the following 16-alkoxy derivatives are prepared: methoxy, ethoxy, isopropoxy, n-butoxy, hexoxy, n-octoxy, decoxy, tetradecoxy, octadecoxy, allyloxy, crotoxy, cinnamoxy, i-butoxy, benzyloxy, 2-hydroxyethoxy and cis-9-octadecenoxy.

EXAMPLE XIX

*17,20;20,21-bismethylenedioxy-3-keto-5α,11α-dihydroxy-6β-fluoro-16-alkoxy-allopregnane-3-ethylene ketal-11-acetate*

A solution of the desired product of Example XVIII (2 g.) in acetic acid (15 ml.) and acetic anhydride (1 ml.) is stirred for two days at room temperature with potassium bifluoride (4.2 g.). The mixture is then diluted with methylene chloride (100 ml.) and the resulting solution washed three times with equal volumes of water. The methylene chloride solution is dried over anhydrous sodium sulfate then evaporated to dryness to give the desired product.

The following 16-alkoxy compounds are thus prepared: methoxy, ethoxy, isopropoxy, n-butoxy, hexoxy, n-octoxy, decoxy, tetradecoxy, octadecoxy, allyloxy, crotoxy, cinnamoxy, i-butoxy, benzyloxy, 2-hydroxyethoxy and cis-9-octadecenoxy.

Substitution of hydrogen chloride for potassium bifluoride produces the corresponding 17,20;20,21-bismethylenedioxy-3-keto-5α,11α-dihydroxy-6β-chloro-16-alkoxy-allopregnane-3-ethylene ketal-11-acetates wherein the 16-alkoxy group is methoxy, ethoxy, isopropoxy, n-butoxy, hexoxy, n-octoxy, decoxy, tetradecoxy, octadecoxy, allyloxy, crotoxy, cinnamoxy, i-butoxy, benzyloxy, 2-hydroxyethoxy and cis-9-octadecenoxy.

EXAMPLE XX

*17,20;20,21-bismethylenedioxy-3-keto-5α,11α-dihydroxy-6β-methyl-16-methoxy-allopregnane-3-ethylene ketal-11-acetate*

A solution of the 17,20;20,21-3-keto-5α,6α-oxido-11α-hydroxy 16-alkoxy-allopregnane-3-ethylene ketal-11-acetate (5 g.) in 300 ml. of a 1:1 ether-tetrahydrofuran solution is cooled to 0° to 5° C. and added dropwise to a solution of methylmagnesium bromide (2.5 g.) in 100 ml. of 1:1 ether-tetrahydrofuran solution at 0° to 5° C. over a one hour period. After 20 hours, the solvent is removed by distillation and the residue decomposed by the addition of 100 ml. of ice-water. The product is isolated by ether extraction followed by drying and evaporation of the solvent.

The following 16-alkoxy-analogs and homologs are likewise prepared: 16-ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, cis-9-octadecenoxy.

EXAMPLE XXI

*17,20;20,21-bismethylenedioxy-3,11-diketo-5α-hydroxy-6β-fluoro-16-methoxy-allopregnane*

A suspension of the product of Example XIX (2 g.) in 0.25 N methanolic perchloric acid (40 ml.) is shaken at room temperature for 20 hours. Water is then added and the resulting product filtered and washed carefully with sodium acetate solution followed by water. The crude product (2 g.) is then oxidized in glacial acetic acid (80 ml.) with chromium trioxide (0.5 g.) for 45 minutes. Alcohol (20 ml.) is added and the mixture concentrated to a syrup. The product is isolated with chloroform and the chloroform residue recrystallized from 95% alcohol.

By the same procedure, but using the appropriate 17,20;20,21-bismethylenedioxy-3-keto-5α,11α-dihydroxy-6β-fluoro-16-alkoxy-allopregnane-3-ethylene ketal 11-acetate, or the corresponding 6β-chloro or 6β-methyl derivatives of Examples XIX and XX respectively, the following 16-alkoxy derivatives of 17,20;20,21-bismethylenedioxy-3,11-diketo-5α-hydroxy-6β-fluoro-allopregnane and of the corresponding 6β-chloro and 6β-methyl derivatives are prepared: 16-methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, cis-9-octadecenoxy.

EXAMPLE XXII

*17,20;20,21-bismethylenedioxy-6β-fluoro-16-alkoxy-Δ⁴-pregnene-3,11-dione*

The appropriate 17,20;20,21-bismethylenedioxy-3,11-diketo-5α-hydroxy-6β-fluoro-16-alkoxy-allopregnane product of Example XXI (2 g.) is dehydrated by heating to reflux in acetic acid (100 ml.) and water (0.2 ml.) for one hour, then cooled, diluted with 100 ml. of water and evaporated to dryness under reduced pressure. The residue is used directly in the following example. In this manner the following 16-alkoxy derivatives are obtained: methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyetnoxy, cis-9-octadecenoxy.

On repeating the above procedure but using the appropriate 17,20;20,21-bismethylenedioxy-3,11-diketo-5α- hydroxy-6β-chloro-16-alkoxy-allopregnane or the corresponding 6β-methyl compound the following 16-alkoxy derivatives of 17,20;20,21-bismethylenedioxy-6β-chloro-Δ⁴-pregnene-3,11-dione and of 17,20;20,21-bismethylenedioxy-6β-methyl-Δ⁴-pregnene-3,11-dione are prepared: 16-methoxy-ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, cis-9-octadecenoxy.

EXAMPLE XXIII

*17,20;20,21-bismethylenedioxy-6β-fluoro-16β-alkoxy-Δ⁵-pregnene-11β-ol-3-one-3-ethylene ketal*

The products of Example XXII are converted to the corresponding 3-ethylene ketal derivatives according to the procedure of Example XVII. The products thus obtained are then reduced with sodium borohydride in anhydrous ether over a 2 hour period. Water is then slowly added and the ether phase separated. The aqueous phase is extracted with ethyl acetate and the extract added to the ether phase. The combined ether-ethyl acetate solution is washed with water, dried and evaporated to dryness under reduced pressure. The products are used directly in the following example. The following 17,20;20,21-bismethylenedioxy - 6β - fluoro - 16 - alkoxy - Δ⁵ - pregnene-11β-ol-3-one-3-ethylene ketals are thus obtained: 16-methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, cis-9-octadecenoxy.

The 6β-chloro- and 6β-methyl products of Example XXII are likewise reduced to the respective 17,20;20,21-bismethylenedioxy-6β-chloro, and 6β-methyl-16-alkoxy-Δ⁵-pregnene-11β-ol-3-one-ethylene ketals: 16-methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyetnoxy, cis-9-octadecenoxy.

EXAMPLE XXIV

*6β-fluoro-16-alkoxy-Δ⁴-pregnene-11β,17α,21-triol-3,20-dione 21-acetates*

Hydrolysis of the 6β-fluoro products of Example XXIII according to the procedure of Example XXI produces the corresponding 17,20;20,21-bismethylenedioxy-6β-fluoro-16-alkoxy-Δ⁴-pregnene-11β-ol-3-one. Formic acid hydrolysis of the products thus obtained according to the procedure of Example IV gives the corresponding 6β-fluoro - 16 - alkoxy - Δ⁴ - pregnene - 11β,17α,21 - triol-3,20-diones which are then acetylated with acetic anhydride in pyridine to produce the corresponding 21-acetates.

In like manner, 17,20;20,21-bismethylenedioxy-6β-chloro-16-alkoxy-Δ⁵-pregnene-11β-ol-3-ethylene ketal and 17,20;20,21 - bismethylenedioxy - 6β - methyl - 16 - alkoxy-Δ⁵-pregnene-11β-ol-3-ethylene ketal are converted to the corresponding 6β-chloro-16-alkoxy-Δ⁴-pregnene-11β, 17α,21-triol-3,20-dione 21-acetates and 6β-methyl-16-alkoxy-Δ⁴-pregnene-11β,17α,21-triol-3,20-dione 21-acetates wherein the 16-alkoxy group is methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, cis-9-octadecenoxy.

EXAMPLE XXV

*6α-fluoro-16-alkoxy-Δ⁴-pregnene-11β,17α,21-triol-3,20-dione*

Into a solution of each of the products of Example XXIV (2 g.) in chloroform (175 ml.) and absolute alcohol (1.5 ml.) at −5° C. to −10° C., a stream of anhydrous hydrochloric acid is bubbled for about 3 hours. At the end of this period, the solution is diluted with chloroform (300 ml.), washed successively with sodium bicarbonate and water, dried and evaporated to dryness under reduced pressure at 35–45° C. The residue 6α-fluoro - 16 - alkoxy - Δ⁴ - pregnene - 11β,17α,21 - triol-3,20-dione 21-acetate is recrystallized from acetone-Skellysolve B. Acid hydrolysis gives the corresponding 21-alcohols.

In the same manner, the remaining products of Example XXIV are converted to their respective 6α-isomers to give 16-alkoxy derivatives of 6α-chloro-Δ⁴-pregnene-11β,17α, 21 - triol-3,20-dione, 6α-methyl-Δ⁴-pregnene-11β,17α,21-triol - 3,20 - dione, 6α - fluoro - Δ⁴ - pregnene-11β,17α,21-triol-3,20-dione wherein the 16-alkoxy substituent is methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, and cis-9-octadecenoxy.

EXAMPLE XXVI

*6α-fluoro-16-alkoxy-Δ⁴-pregnene-17α,21-diol-3,11,20-trione*

Oxidation of the 6α-fluoro-16-alkoxy-Δ⁴-pregnene-11β, 17α,21-triol-3,20-dione 21-acetates of Example XXV with chromium trioxide in glacial acetic acid according to the procedure of Example VII gives the corresponding 6α-fluoro-16-alkoxy-Δ⁴-pregene-17α,21-diol-3,11,20-trione 21-acetates wherein the alkoxy group is methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, and cis-9-octadecenoxy.

Following the same procedure the remaining products of Example XXV are oxidized to the respective 6α-chloro-16-alkoxy-Δ⁴-pregnene-17α,21-diol-3,11-20-trione 21-acetates and 6α-methyl-16-alkoxy-Δ⁴-pregnene-17α,21-diol-3, 11,20-trione 21-acetates wherein the alkoxy group has the same significance given above.

Hydrolysis of the 21-acetates according to known procedures gives the corresponding 21-alcohols.

EXAMPLE XXVII

*6α-substituted-9α-fluoro-16-alkoxy-Δ⁴-pregnene-11β,17α,21-triol-3,20-dione*

The products of Example XXV are dehydrated at the 9,11-positions by treatment in anhydrous pyridine solution at 0° C. with a solution of methanesulfonyl chloride in chloroform. After about 1 hour, the mixture is allowed to come to room temperature and left standing for 10 hours. The solution is then added dropwise to ice water with stirring to precipitate the desired 6α-substituted-Δ⁴,⁹⁽¹¹⁾ - pregnadiene - 17α,21 - diol-3,20-dione 21-acetate. The products are recovered by filtration and dried.

The products thus obtained are then treated successively with hypobromous acid, potassium acetate, and a fluorinating agent according to the procedures of Examples X, XI, and XII to give 6α,9α-difluoro-16-alkoxy-Δ⁴-pregnene-11β,17α,21 - triol-3,20-dione 21-acetates; 6α-chloro-9α-fluoro - 16 - alkoxy - Δ⁴ - pregnene - 11β,17α,21 - triol-3,20-dione 21-acetates; 6α-methyl-9α-fluoro-16-alkoxy-Δ⁴-pregnene-11β,17α,21-triol-3,20-dione 21-acetates wherein the 16-alkoxy group is methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy and cis-9-octadecenoxy.

Acid hydrolysis of the 21-acetates according to known procedures gives the corresponding 21-alcohols.

EXAMPLE XXVIII

*6α-substituted-9α-fluoro-16-alkoxy-Δ⁴-pregnene-17α,21-diol-3,11,20-trione*

Oxidation of the products of Example XXVII according to the procedure of Example VII produces the corresponding 6α,9α-difluoro-16-alkoxy-Δ⁴-pregnene-17α,21-diol-, 3,11,20-trione-21-acetates; 6α-chloro-9α-fluoro-16-alkoxy-Δ⁴-pregnene-17α,21-diol-3,11,20-trione-21-acetates; 6α-methyl-9α-fluoro-16-alkoxy-Δ⁴-pregnene - 17α,21 - diol 3,11,20-trione 21-acetates wherein the 16-alkoxy group is methoxy, ethoxy, isopropoxy, butoxy, isobutoxy, hexoxy, n-octoxy, decoxy, tetradecoxy octadecoxy, allyloxy,

EXAMPLE XXIX

*6α-substituted-16-alkoxy-Δ¹,⁴-pregnadiene derivatives*

Following the procedure of Example V, but using the appropriate 16-alkoxy corticosteroid, the following compounds are prepared:

6α,9α-difluoro-16-alkoxy-Δ¹,⁴-pregnadiene-11β,17α,21-triol-3,20-dione
6α,9α-difluoro-16-alkoxy-Δ¹,⁴-pregnadiene-17α,21-diol-3,11,20-trione
6α-chloro-9α-fluoro-16-alkoxy-Δ¹,⁴-pregnadiene-11β,17α,21-triol-3,20-dione
6α-chloro-9α-fluoro-16-alkoxy-Δ¹,⁴-pregnadiene-17α,21-diol-3,11,20-trione
6α-methyl-9α-fluoro-16-alkoxy-Δ¹,⁴-pregnadiene-11β,17α,21-triol-3,20-dione
6α-methyl-9α-fluoro-16-alkoxy-Δ¹,⁴-pregnadiene-17α,21-diol-3,11,20-trione
6α-fluoro-16-alkoxy-Δ¹,⁴-pregnadiene-11β,17α,21-triol-3,20-dione
6α-fluoro-16-alkoxy-Δ¹,⁴-pregnadiene-17α,21-diol-3,11,20-trione
6α-chloro-16-alkoxy-Δ¹,⁴-pregnadiene-11β,17α,21-triol-3,20-dione
6α-chloro-16-alkoxy-Δ¹,⁴-pregnadiene-17α,21-diol-3,11,20-trione
6α-methyl-16-alkoxy-Δ¹,⁴-pregnadiene-11β,17α,21-triol-3,20-dione
6α-methyl-16-alkoxy-Δ¹,⁴-pregnadiene-17α,21-diol-3,11,20-trione wherein the 16-alkoxy group is methoxy, ethoxy, isopropoxy, butoxy, isobutoxy, hexoxy, n-octoxy, decoxy, tetradecoxy, octadexocy, allyloxy, crotoxy, cinnamoxy, benzyloxy, hydroxyethoxy, and cis-9-octadecenoxy.

EXAMPLE XXX

*16-alkoxy-Δ⁴,⁶-pregnadiene-derivatives*

Dehydrogenation of the appropriate 16-alkoxy corticosteroid with chloranil under mild conditions according to the method of Agnello and Laubach, J. Am. Chem. Soc., 79, 1257 (1957), produces the corresponding 16-alkoxy-Δ⁴,⁶-pregnadiene - corticosteroids. The following compounds are thus prepared:

16-alkoxy-Δ⁴,⁶-pregnadiene-11β,17α,21-triol-3,20-dione
16-alkoxy-Δ⁴,⁶-pregnadiene-17α,21-diol-3,11,20-trione
9α-fluoro-16-alkoxy-Δ⁴,⁶-pregnadiene-11β,17α,21-triol-3,20-dione
9α-fluoro-16-alkoxy-Δ⁴,⁶-pregnadiene-17α,21-diol-3,11,20-trione
6α,9α-difluoro-16-alkoxy-Δ⁴,⁶-pregnadiene-11β,17α,21-triol-3,20-dione
6α,9α-difluoro-16-alkoxy-Δ⁴,⁶-pregnadiene-17α,21-diol-3,11,20-trione
6α-chloro-9α-fluoro-16-alkoxy-Δ⁴,⁶-pregnadiene-11β,17α,21-triol-3,20-dione
6α-chloro-9α-fluoro-16-alkoxy-Δ⁴,⁶-pregnadiene-17α,21-diol-3,11,20-trione
6α-methyl-9α-fluoro-16-alkoxy-Δ⁴,⁶-pregnadiene-11β,17α,21-triol-3,20-dione
6α-methyl-9α-fluoro-16-alkoxy-Δ⁴,⁶-pregnadiene-17α,21-diol-3,11,20-trione
6α-fluoro-16-alkoxy-Δ⁴,⁶-pregnadiene-11β,17α,21-triol-3,20-dione
6α-fluoro-16-alkoxy-Δ⁴,⁶-pregnadiene-17α,21-diol-3,11,20-trione
6α-chloro-16-alkoxy-Δ⁴,⁶-pregnadiene-11β,17α,21-triol-3,20-dione
6α-chloro-16-alkoxy-Δ⁴,⁶-pregnadiene-17α,21-diol-3,20-dione
6α-chloro-16-alkoxy-Δ⁴,⁶-pregnadiene-17α,21-diol-3,11,20-trione
6α-methyl-16-alkoxy-Δ⁴,⁶-pregnadiene-11β,17α,21-triol-3,20-dione
6α-methyl-16-alkoxy-Δ⁴,⁶-pregnadiene-17α,21-diol-3,11,20-trione wherein the 16-alkoxy group is methoxy, ethoxy, isopropoxy, butoxy, isobutoxy, hexoxy, n-octoxy, decoxy, tetradecoxy, octadecoxy, allyloxy, crotoxy, cinnamoxy, benzyloxy, hydroxyethoxy, and cis-9-octadecenoxy.

EXAMPLE XXXI

*16-alkoxy-Δ¹,⁴,⁶-pregnatriene-derivatives*

On repeating Example XXX but using 3 to 6 moles of chloranil per mole of the appropriate 16-alkoxy-corticosteroid as described by Agnello and Laubach, J. Am. Chem. Soc., 79, 1257 (1957), the following 16-alkoxy-Δ¹,⁴,⁶-pregnatrienes are obtained.

16-alkoxy-Δ¹,⁴,⁶-pregnatriene-11β,17α,21-triol-3,20-dione
16-alkoxy-Δ¹,⁴,⁶-pregnatriene-17α,21-diol-3,11,20-trione
9α-fluoro-16-alkoxy-Δ¹,⁴,⁶-pregnatriene-11β,17α,21-triol-3,20-dione
9α-fluoro-16-alkoxy-Δ¹,⁴,⁶-pregnatriene-17α,21-diol-3,11,20-trione
6α,9α-difluoro-16-alkoxy-Δ¹,⁴,⁶-pregnatriene-11β,17α,21-triol-3,20-dione
6α,9α-difluoro-16-alkoxy-Δ¹,⁴,⁶-pregnatriene-17α,21-diol-3,11,20-trione
6α-chloro-9α-fluoro-16-alkoxy-Δ¹,⁴,⁶-pregnatriene-11β,17α,21-triol-3,20-dione
6α-chloro-9α-fluoro-16-alkoxy-Δ¹,⁴,⁶-pregnatriene-17α,21-diol-3,11,20-trione
6α-methyl-9α-fluoro-16-alkoxy-Δ¹,⁴,⁶-pregnatriene-11β,17α,21-triol-3,20-dione
6α-methyl-9α-fluoro-16-alkoxy-Δ¹,⁴,⁶-pregnatriene-17α,21-diol-3,11,20-trione
6α-fluoro-16-alkoxy-Δ¹,⁴,⁶-pregnatriene-11β,17α,21-diol-3,20-dione
6α-fluoro-16-alkoxy-Δ¹,⁴,⁶-pregnatriene-17α,21-diol-3,11,20-trione
6α-chloro-16-alkoxy-Δ¹,⁴,⁶-pregnatriene-17β,17α,21-triol-3,20-dione
6α-chloro-16-alkoxy-Δ¹,⁴,⁶-pregnatriene-17α,21-diol-3,11,20-trione
6α-methyl-16-alkoxy-Δ¹,⁴,⁶-pregnatriene-11β,17α,21-triol-3,20-dione
6α-methyl-16-alkoxy-Δ¹,⁴,⁶-pregnatriene-17α,21-diol-3,11,20-trione The same products are obtained by the action of chloranil on the 16-alkoxy Δ¹,⁴-pregnadiene compounds of Examples VI, VIII, and XXIX.

EXAMPLE XXXII

A variety of esters of the 16-alkoxy-corticosteroid products are prepared using acyl chlorides or acyl anhydrides as acylating agents in accordance with conventional methods. These include such esters as the formate, the propionate, the isobutyrate, the hexanoate, the octanoate, the benzoate, the half-ester of succinic acid and the monosodium and monopotassium salts thereof and the half-ester of maleic acid and the monosodium and monopotassium salts thereof.

What is claimed is:

1. A process for making a compound selected from the group consisting of

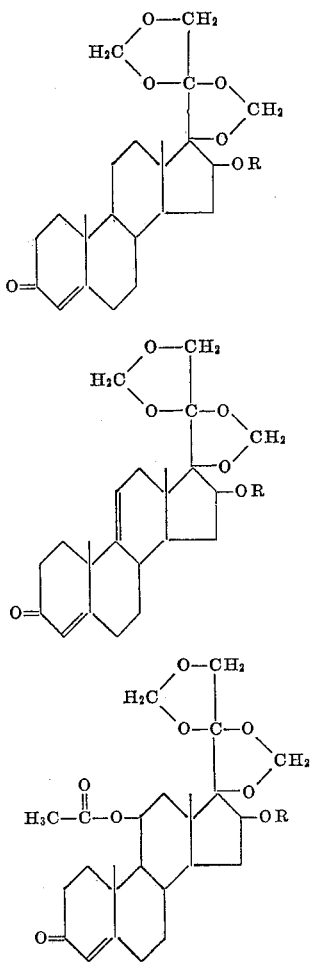

wherein R is selected from the group consisting of alkyl and alkenyl radicals containing from one to eighteen carbon atoms, benzyl, cinnamyl, 2-hydroxyethyl, which comprises: treating under anhydrous conditions a compound selected from the group consisting of 17,20; 20,21-bismethylenedioxy-16β-bromo-$\Delta^4$-pregnene-3-one; 17,20; 20,21-bismethylenedioxy - 16β-bromo-$\Delta^{4,9(11)}$-pregnadiene-3-one; 17,20;20,21-bismethylenedioxy-16β-bromo-$\Delta^4$-pregnene-3-one-11α-acetate and the corresponding 16β-chloro analogs thereof with a silver salt selected from the group consisting of silver perchlorate and silver fluoride in the presence of at least about 1 mole of an alcohol selected from the group consisting of saturated and unsaturated aliphatic alcohols containing from one to eighteen carbon atoms, ethylene glycol, benzyl alcohol and cinnamyl alcohol, per mole of the said 16β-bromo compound, and 16β-chloro compound.

2. The process of claim 1 wherein the reaction is conducted in the presence of a neutralizing agent selected from the group consisting of silver oxide and silver carbonate, the mole ratio of neutralizing agent:silver salt: 17,20;20,21-bismethylenedioxy - 16β - bromo compound ranging from about 1:2:2 to about 2:12:1, and at a temperature of about the reflux temperature of the alcohol but below 200° C.

3. 17,20;20,21-bismethylenedioxy - 16β-alkoxy-$\Delta^4$-pregnene-3-ones.

4. 17,20;20,21-bismethylenedioxy - 16β-alkoxy-$\Delta^{4,9(11)}$-pregnadiene-3-ones.

5. 17,20;20,21 - bismethylenedioxy-16β-alkoxy-$\Delta^4$-pregnene-3-one-11α-acetates.

References Cited in the file of this patent

UNITED STATES PATENTS

| | | |
|---|---|---|
| 2,779,774 | Hirschmann et al. | Jan. 29, 1957 |
| 2,838,546 | Magerlein et al. | June 10, 1958 |
| 2,879,279 | Van der Burg | Mar. 24, 1959 |
| 2,888,457 | Beyler et al. | May 26, 1959 |
| 2,946,812 | Fried et al. | July 26, 1960 |

OTHER REFERENCES

Bernstein et al.: J. Am. Chem. Soc., vol. 81, pages 1689–96 (April 1959).